Patented July 23, 1946

2,404,551

UNITED STATES PATENT OFFICE 2,404,551

TREATMENT OF HYDROCARBONS

John D. Upham, Bartlesville, Okla., assignor to Phillips Petroleum Company, a corporation of Delaware No Drawing. Application October 5, 1942, Serial No. 460,853

10 Claims. (Cl. 260—683.5)

This invention relates to hydrocarbon conversion processes utilizing metal halide catalysts of the Friedel-Crafts type. More particularly it relates to the treatment of metal halide-hydrocarbon sludges formed in hydrocarbon conversions such as isomerization and alkylation reactions catalyzed by aluminum chloride, aluminum bromide, and the like.

Of great commercial interest at the present time are the isomerization and alkylation of lowboiling hydrocarbons, particularly members of the paraffin series such as the butanes and pentanes. In these reactions a simple chemical change is effected under relatively mild conditions. In the case of isomerization a change in carbon skeleton without change in number of carbon atoms occurs, and in the case of alkylation the direct union of two molecules, such as an isoparaffin and olefin, occurs to produce a higher molecular weight saturated hydrocarbon. The alkylation of aromatic hydrocarbons, for example the alkylation of benzene with ethylene, is also of considerable importance at the present time. These various reactions are known to be catalyzed to a greater or lesser extent by the so-called Friedel-Crafts type metal halide catalysts, among the better known of which may be mentioned aluminum chloride, aluminum bromide, boron fluoride, zinc chloride, ferric chloride, antimony trifluoride, and other polyvalent metal halides. Aluminum chloride has to date received the greatest commercial acceptance due to its activity, relatively low cost, and availability. Accordingly, because of its importance, and for the sake of convenience, I shall describe my invention with particular reference to the isomerization of normal butane to isobutane as catalyzed by aluminum chloride. Application of the invention to other similar hydrocarbon conversions, using aluminum chloride or other Friedel-Crafts type metal halide catalysts will be apparent to those skilled in the art in view of the disclosure to follow. In such conversion processes, a catalyst activator is generally used. This activator is frequently a hydrogen halide, preferably hydrogen chloride.

In processes utilizing anhydrous aluminum chloride as a catalyst, the aluminum chloride may be charged to the process as a solid, or as a slurry formed by dissolving and/or suspending a considerable amount of aluminum chloride in hydrocarbons or other suitable liquids. In either case, a liquid sludge is formed after a short period of operation. Such slurries or sludges may comprise complexes of aluminum chloride with hydrocarbons, as well as dissolved aluminum chloride. In the case of sludges formed primarily by contact of catalyst with hydrocarbon reactants, as for example when normal butane is passed over a bed of solid aluminum chloride, such sludges have a high absorption or solution capacity for free aluminum chloride and generally carry substantial amounts of free aluminum chloride when removed from the reaction zone. Unless this aluminum chloride can be recovered in some way, it is lost from the system. In the case wherein a slurry of aluminum chloride is used in or circulated through a reaction zone, a portion or all of such slurry is withdrawn and replaced by fresh aluminum chloride. Generally this must be done while the slurry still contains relatively large amounts of free aluminum chloride, but insufficient for carrying out the reaction at an uneconomic level. In general, reference in this application to sludges refers to sludges formed by contact of hydrocarbon reactants with a catalyst, and to suspensions or slurries of metal halide catalyst in suitable liquids such as, for example, heavy hydrocarbons. Said sludges may comprise metal halide-hydrocarbon complexes, and prior to treatment according to my invention contain free or uncombined aluminum chloride.

It is an object of this invention to provide for improved hydrocarbon reactions wherein a Friedel-Crafts type metal halide is used as catalyst, particularly when a hydrogen halide is used as catalyst activator. Another object is to provide for the treatment of metal halide sludge formed during such reactions. A further object is to provide for carrying out such hydrocarbon conversions as isomerization, alkylation and the like with aluminum halide and similar catalysts continuously. Yet another object is to recover free aluminum chloride from aluminum chloride-hydrocarbon sludges in a form suitable for re-use. Many other objects and advantages of the invention will become apparent as the disclosure proceeds.

In accordance with my invention, a sludge or slurry from which it is desired to remove a free Friedel-Crafts type metal halide, such as aluminum chloride, is contacted with a liquid substantially anhydrous hydrogen halide, such as hydrogen chloride. Said liquid hydrogen halide acts to dissolve metal halide from the inactive material, which may comprise hydrocarbons and/or hydrocarbon-metal halide complexes. In addition to the solvent action of the hydrogen halide, it may also act to set free a certain amount of metal halide not ordinarily recovered from loose combination in the sludge. In this manner, valuable free metal halide is recovered from the sludge, and may in turn be recovered from solution in the hydrogen halide and re-used as desired.

A convenient manner of recovering said metal halide from solution in hydrogen halide is to subject the solution to a sufficiently high temperature and/or a sufficiently low pressure to effect vaporization of the hydrogen halide. Since all of the hydrogen halides are relatively low-boiling materials, this is readily accomplished. The metal halide may in some cases form a loose complex with the hydrogen halide, but such complexes are readily broken up into their components.

As an example of the application of my invention, an isomerization process will be discussed in which normal butane is converted to isobutane by the action of aluminum chloride activated with hydrogen chloride. In such a process, dry normal butane is passed at suitable temperatures and pressures over an aluminum chloride catalyst, along with hydrogen chloride. As the isomerization reaction proceeds, a liquid aluminum chloride sludge is formed which contains considerable aluminum chloride that is still catalytically active insofar as the isomerization reaction is concerned. Ordinarily this sludge is withdrawn from the reaction chamber and discarded, or subjected to use involving loss or destruction of the active aluminum chloride. However, in the practice of the present invention, this sludge may be withdrawn from the reaction chamber, and is intimately contacted with liquid hydrogen chloride. This may be done conveniently by counter-current flow through a small tower packed with stones, Raschig rings, or the like, or the two liquids may be mixed mechanically as by stirrers, pumping, etc.

The temperature chosen for this contacting is of course below the critical temperature of hydrogen chloride, and is generally chosen as a matter of convenience, depending upon the temperature at which the sludge and hydrogen chloride are obtained. Heating or cooling either or both to the desired temperature is readily accomplished. The hydrogen chloride is maintained under sufficient pressure in the contacting step to ensure the presence of liquid hydrogen chloride.

In the isomerization process described, the hydrogen chloride, which may comprise, for example, from about 3 to about 15 per cent or more of the butane feed, is ordinarily separated from the isobutane, unconverted normal butane and other constituents of the effluent, and recycled to the reaction zone. One of the most suitable methods of effecting this separation is by fractional distillation, in which ordinarily the overhead comprises hydrogen chloride, and sometimes propane or other light hydrocarbon gases. This overhead is at least partially condensed, and a portion of the condensate returned to the fractionating column as reflux. The portion of this condensate not used as reflux, and which it is desired to return to the reaction zone, is a very convenient source of liquid hydrogen chloride for washing the sludge. Accordingly, a preferred manner of carrying out my invention involves passing at least a portion of the recycle hydrogen chloride stream, which is liquefied as described or otherwise, into contact with the sludge containing free aluminum chloride withdrawn from the reaction chamber, thus dissolving out said free aluminum chloride, and passing the resultant solution of aluminum chloride in liquid hydrogen chloride into the reaction zone. The hydrogen chloride, which may or may not vaporize in the reaction zone, acts as activator therein, and aluminum chloride carried out by the sludge is returned to the reaction zone for re-use as isomerization catalyst. Liquid hydrogen chloride other than that recycled may of course be used, if convenient, in dissolving aluminum chloride from the sludge, with subsequent introduction of the resulting solution into the reaction zone.

The spent sludge from which free aluminum chloride has been removed has substantially no catalytic activity for the isomerization reaction, is substantially insoluble in the hydrocarbons being converted, and may be disposed of or utilized for any desired purpose.

As another example, the invention may be applied suitably to the continuous alkylation of benzene with normally gaseous olefins such as ethylene using aluminum chloride slurried in the reaction mixture. In such a process a slurry of finely divided aluminum chloride may be first prepared by suspension of aluminum chloride in a heavy oil, or aluminum chloride may be suspended directly in liquid reactants. In any case, a common method of operation is to circulate continuously the aluminum chloride through the reaction zone. A small side stream of aluminum chloride-containing sludge is continuously drawn off, and fresh make-up aluminum chloride added to the reaction mixture. My invention may be used to recover free aluminum chloride from said sludge, and to reintroduce the thus-recovered aluminum chloride into the reaction zone. Undesired material is thus removed from the system as an inactive sludge, while uncombined aluminum chloride is returned to use.

While the invention has been described with particular reference to an aluminum halide, especially aluminum chloride, as the Friedel-Crafts type halide, and to hydrogen chloride as the hydrogen halide, other metal halides and hydrogen halides may be used by following the general principles set forth herein, suitably modified with regard to the particular application.

I claim:

1. A process for the isomerization of normal butane to produce isobutane which comprises contacting normal butane admixed with catalyst-activating amounts of hydrogen chloride with an aluminum chloride isomerization catalyst in a reaction zone at conditions effecting the formation of isobutane and a liquid aluminum chloride-hydrocarbon sludge containing substantial amounts of uncombined aluminum chloride, withdrawing said sludge from said reaction zone, fractionally distilling effluents of said reaction zone comprising hydrogen chloride, isobutane, and unconverted normal butane to produce an overhead product comprising said hydrogen chloride, at least partially condensing said overhead product to form a liquid hydrogen chloride-containing condensate, intimately contacting said sludge with at least a portion of said condensate at a temperature below the critical temperature of hydrogen chloride and at sufficient pressure to maintain said condensate in the liquid phase thereby dissolving said uncombined aluminum chloride from said sludge, discharging from the process a resulting insoluble inactive liquid sludge, and returning the resulting solution of aluminum chloride in said hydrogen chloride-containing condensate to said reaction zone for further utilization of said aluminum chloride as catalyst and for further utilization of said hydrogen chloride as catalyst activator.

2. In a process for the isomerization of saturated hydrocarbons which comprises admixing catalyst-activating amounts of hydrogen halide with a saturated hydrocarbon material to be isomerized, contacting the resulting mixture with a Friedel-Crafts type metal halide isomerization catalyst in a reaction zone at conditions suitable for effecting isomerization, a formation of a liquid metal halide-hydrocarbon sludge containing substantial amounts of uncombined metal halide also being effected, withdrawing said sludge from said reaction zone, separating reaction products and hydrogen halide from effluents of said reaction zone, and returning a hydrogen halide recycle stream comprising so-separated hydrogen halide to said reaction zone for re-use of said hydrogen halide as catalyst activator, the improvement which comprises: intimately contacting said hydrogen halide recycle stream in the liquid phase with said sludge to dissolve said uncombined metal halide from said sludge, whereby said uncombined metal halide is returned to said reaction zone in solution in said hydrogen halide recycle stream for re-use as catalyst therein.

3. A process for the recovery of the free aluminum chloride content of a liquid sludge comprising free aluminum chloride dissolved in liquid aluminum chloride-hydrocarbon complexes, which comprises selectively extracting such a sludge with liquid anhydrous hydrogen chloride at temperatures below the critical temperature of hydrogen chloride and pressures sufficient to maintain said hydrogen chloride in liquid phase to form a solution of said free aluminum chloride in said liquid hydrogen chloride, and an insoluble liquid comprising said complexes substantially devoid of free aluminum chloride, and recovering said free aluminum chloride from solution in said liquid hydrogen chloride.

4. A process for the recovery of a metal halide of the Friedel-Crafts type from a liquid metal halide-hydrocarbon sludge containing the same in uncombined form, which comprises contacting such a sludge with a liquid anhydrous hydrogen halide to effect solution of said uncombined metal halide in said liquid hydrogen halide, and separating the resultant solution from the remaining insoluble liquid metal halide-hydrocarbon sludge which is substantially free from uncombined metal halide.

5. The process of claim 2 in which said metal halide is aluminum chloride and said hydrogen halide is hydrogen chloride.

6. The process of claim 2 in which said metal halide and said hydrogen halide are compounds of the same halogen.

7. The process of claim 4 in which said metal halide is an aluminum halide.

8. The process of claim 4 in which said metal halide and said hydrogen halide are compounds of the same halogen.

9. In the recovery of aluminum halide from a hydrocarbon-aluminum halide complex, the steps of extracting the hydrocarbon-aluminum halide complex with a liquefied hydrogen halide and recovering hydrogen halide and aluminum halide from the resulting solution.

10. In the recovery of aluminum halide from a hydrocarbon-aluminum halide complex, the steps of extracting the hydrocarbon-aluminum halide complex with a liquefied hydrogen halide and separating the resulting solution from the remaining complex.

JOHN D. UPHAM.